F. MÜLLER.
AUTOMOBILE BODY.
APPLICATION FILED JUNE 9, 1917.

1,271,745.

Patented July 9, 1918.

INVENTOR
Friederich Müller
BY S. Jay Teller
ATTORNEY

UNITED STATES PATENT OFFICE.

FRIEDERICH MÜLLER, OF HARTFORD, CONNECTICUT.

AUTOMOBILE-BODY.

1,271,745.　　　　　Specification of Letters Patent.　　Patented July 9, 1918.

Application filed June 9, 1917.　Serial No. 173,701.

*To all whom it may concern:*

Be it known that I, FRIEDERICH MÜLLER, a citizen of the United States, residing at Hartford, in the county of Hartford and State of Connecticut, have invented certain new and useful Improvements in Automobile-Bodies, of which the following is a specification, reference being had therein to the accompanying drawing.

The object of the invention is to provide an automobile body which is of generally rigid or fixed construction but which is, nevertheless, adapted to be opened in an improved manner to permit the occupants to receive light and air and to have a relatively unobstructed view.

The invention can be embodied in any one of a number of ways and in the accompanying drawings I have shown the embodiment which I now deem preferable. It will be understood, however, that the drawing is intended to be merely illustrative and is not intended to define or limit the scope of the invention, the accompanying claim being relied upon for that purpose.

Figure 1:
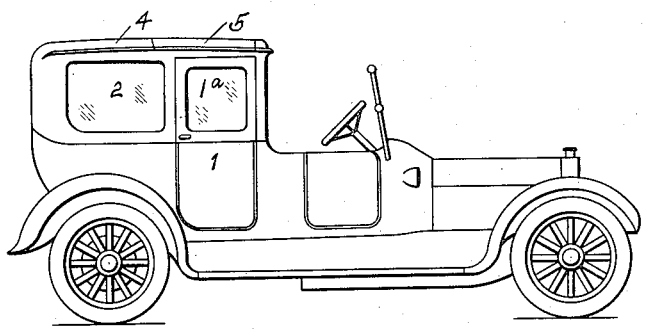
Figure 1 is a side view of an automobile having a body embodying the invention.
Figure 2:
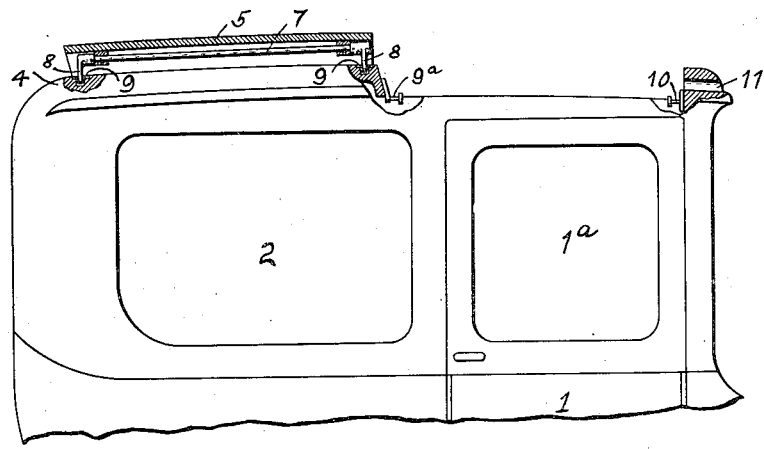
Fig. 2 is an enlarged fragmentary side view showing the body with the door in the roof in open position. Parts of the body are broken away and the door is shown in longitudinal section along the line 2—2 of Fig. 4.

Referring to the drawings it will be seen that I have illustrated an automobile of the limousine type, but it will be understood that I do not limit myself to the exact form of body which is shown. The sides of the body above the level of the seats are provided with windows or panels which can be removed or slid into recesses to leave more or less of the space at each side unobstructed. The construction may be such that the entire side may be opened, but for the sake of illustration I have shown a window 2 which may be lowered into a recess in the side and a window 1ª which may be lowered into a recess in the door 1. The door is hinged to the body in the usual way.

The back of the body is or may be provided with a window 3 constructed in any usual or preferred manner and the front of the body may also be provided with a suitable window constructed as desired. The roof or top of the body is indicated by 4. This has a rigid framework and it is permanently mounted in definite relation to the other parts of the body. As illustrated it is fixedly united with the front, back and side parts. The features thus far described are well known and do not of themselves constitute any part of my invention. Obviously as concerns these features there can be wide variation.

Figure 3:
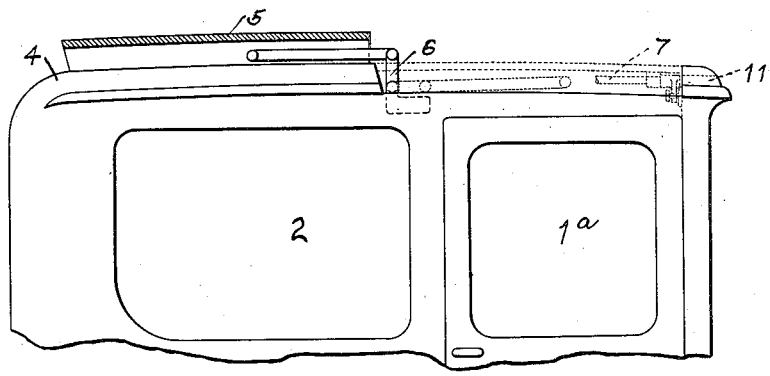
Fig. 3 is a view similar to Fig. 2 except that the door is shown in longitudinal section along the line 3—3 of Fig. 4.

The roof or top is provided at its front with an opening which preferably extends from one side of the roof to the other. Preferably there is a closure for the opening in the form of a door 5 which is adapted to be opened. I do not limit myself to any particular construction for the door nor to any particular means for guiding and holding it. By way of illustration, however, I have shown a door which is connected with the side walls of the body by means of double-jointed hinges 6—6. These hinges permit the door to be placed in open position as shown by the full line in Fig. 3 or in closed position as shown by the dotted line in Fig. 3.

Figure 4:
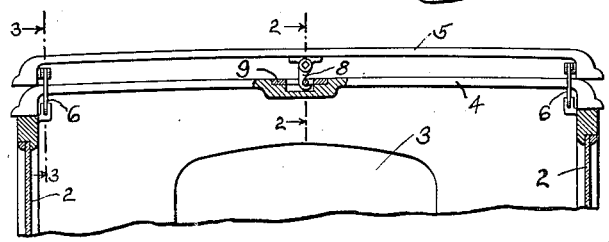
Fig. 4 is a fragmentary transverse sectional view showing the door in open position.

Suitable means are provided for locking the door either in its open position or in its closed position. As shown there is a longitudinal rock shaft 7 which is provided at its end with latches 8—8. Positioned in recesses in the main part of the roof are notched plates 9—9 adapted to be respectively engaged by the latches 8—8. At the front end of the shaft 7 there is provided a squared aperture adapted to receive a key by means of which the shaft can be turned. As shown in Fig. 4 the latches are engaged with the plates thus holding the door in its open position. By inserting the key in the aperture at the front end of the shaft the shaft can be turned to release the latches from engagement with the plates. Secured respectively to the main part of the roof and to the front wall are brackets carrying pins 9ª and 10. These pins are so positioned as to be adapted to be engaged by the latches 8—8 when the door is in its closed position as shown by dotted lines in Fig. 3. An aperture is provided at 11 through which the key may be inserted to turn the shaft 7 when the door is in its closed position. It will be seen from the foregoing description that the latches 8—8 may be used to lock the door either in its open position or in its closed position as required.

When the door 5 is closed, the entire body is or may be closed in the usual manner so as to give the occupants the same amount of protection that is provided by the usual limousine body; or when desired, the windows or panels can be opened or removed in the usual manner to admit air and to provide a less obstructed view of the surroundings. In automobile bodies of this type as heretofore constructed, the front part of the roof has seriously interfered with the occupant's enjoyment of the scenery. With these earlier bodies the occupants were prevented from looking outward except along substantially horizontal lines and could not look upward to any great extent. In accordance with my invention when the weather permits and it is otherwise desirable, the door 5 may be opened in the way already described so as to give the occupants a substantially unobstructed view not only horizontally but also diagonally upward toward the front. At the same time the occupants are not entirely exposed as they are under the rear part of the roof and are thus protected from the sun.

What I claim is:

An automobile body comprising in combination, side, back and front walls including windows and doors, a top of rigid construction permanently mounted in place and having at the front an opening which extends from side to side, a door adapted to close the opening and bodily movable to a position above the top at the rear of the opening, a locking mechanism carried by the door on its underside, means carried by the top and adapted to be engaged by the locking mechanism for holding the door in its open position at the rear of the opening, other means adapted to be engaged by the locking mechanism for holding the door in its closed position in the opening, and means whereby the locking mechanism may be operated.

In testimony whereof, I affix my signature.

FRIEDERICH MÜLLER.